A. VALLOT.
DEVICE FOR MOUNTING HEADLIGHTS ON THE BODIES OF MOTOR CARS.
APPLICATION FILED SEPT. 22, 1913.

1,408,149.

Patented Feb. 28, 1922.
2 SHEETS—SHEET 1.

A. VALLOT.
DEVICE FOR MOUNTING HEADLIGHTS ON THE BODIES OF MOTOR CARS.
APPLICATION FILED SEPT. 22, 1913.
1,408,149.
Patented Feb. 28, 1922.
2 SHEETS—SHEET 2.
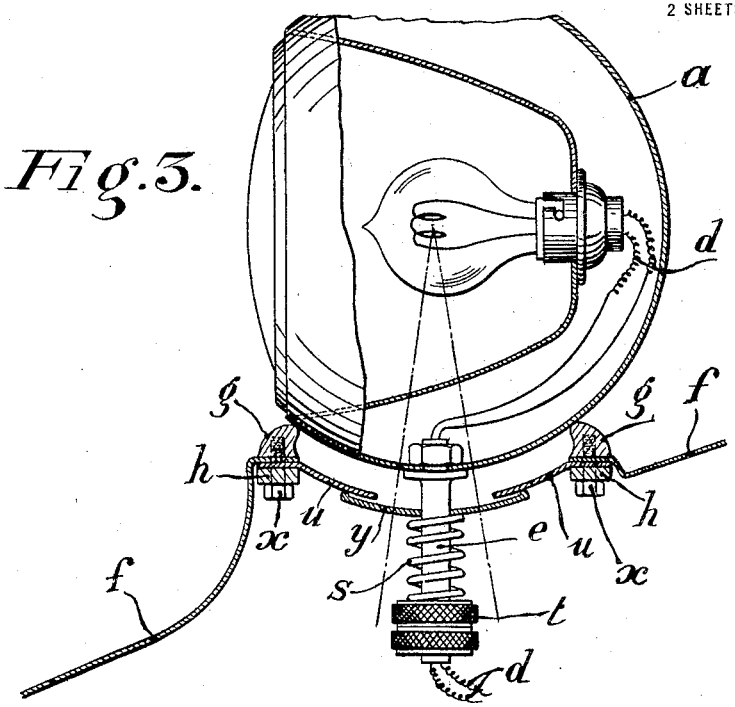
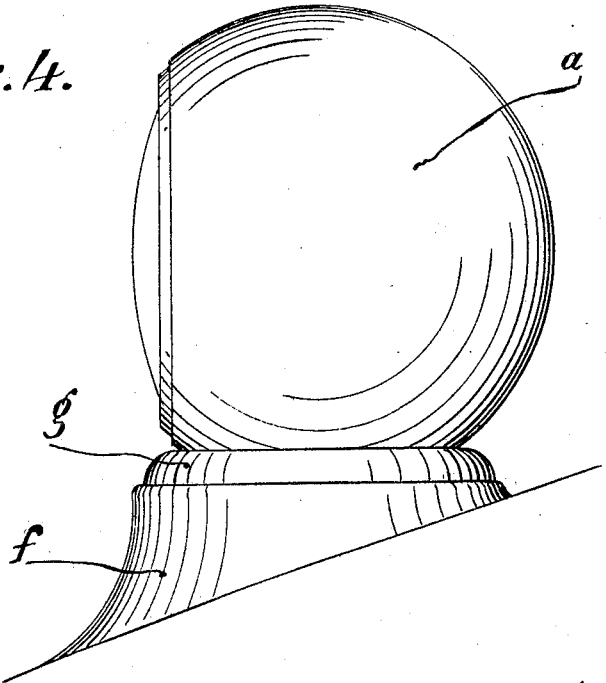

UNITED STATES PATENT OFFICE.

ANDRÉ VALLOT, OF PARIS, FRANCE.

DEVICE FOR MOUNTING HEADLIGHTS ON THE BODIES OF MOTOR CARS.

1,408,149.  Specification of Letters Patent.  Patented Feb. 28, 1922.

Application filed September 22, 1913. Serial No. 791,094.

(GRANTED UNDER THE PROVISIONS OF THE ACT OF MARCH 3, 1921, 41 STAT. L., 1313.)

*To all whom it may concern:*

Be it known that I, ANDRÉ VALLOT, a citizen of the French Republic, residing at Paris, in the Republic of France, have invented certain new and useful Improvements in a Device for Mounting Headlights on the Bodies of Motor Cars, (for which I have filed applications in France, February 20, 1913, Patent No. 455,129, and England, September 27, 1913, Patent No. 21837,) of which the following is a specification.

This invention relates to a device for mounting headlights on the bodies of motor cars, said device being adapted besides to serve for mounting any other articles and not only on the bodies of cars but on any other objects having an outer contour curved or of double curvature.

This device has for its object not only the possibility of fixing the headlights on points of the body of the car where it is very difficult to mount them, specially on the curved parts of the torpedo frames, but also that to move said headlights in a plurality of directions within sufficiently wide limits after the manner of the eye in its orbit so that, according to requirement, either the driving mechanism can be lighted when the car stops, or a sign post upon the road.

In the accompanying drawings the invention is shown:—

Figs. 3 and 4 show another form of construction.

Figure 1:
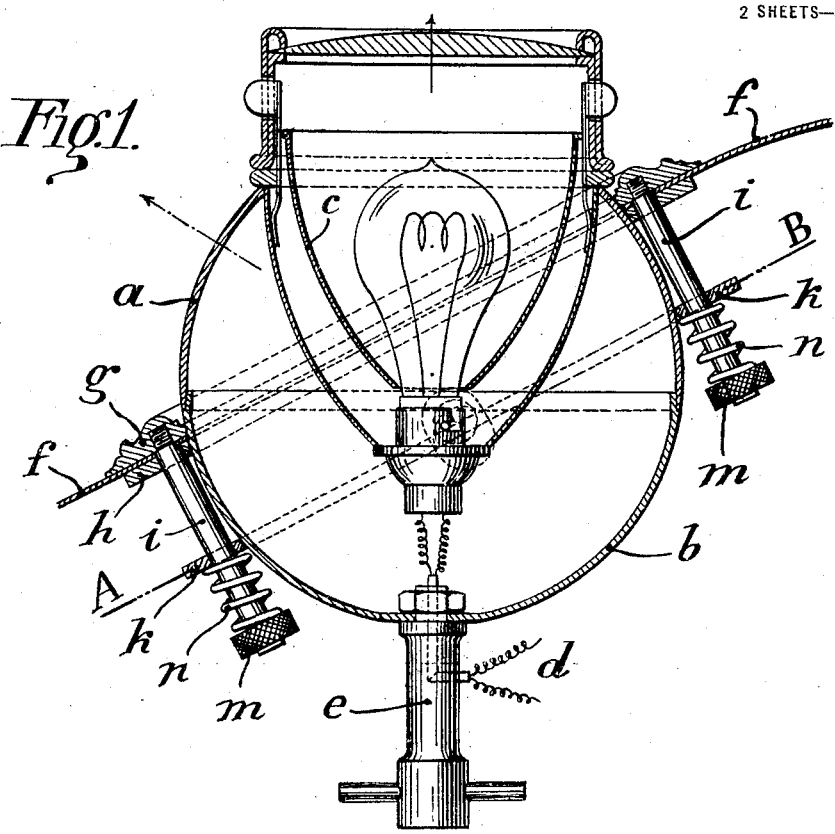
Fig. 1 is a horizontal section.

The fixing apparatus essentially consists of a hollow sphere forming ball joint constructed in any appropriate manner. In the drawings there is shown this sphere as being composed of two hemispheres $a$ and $b$ obtained by pressing a piece of sheet metal and connected the one with the other by welding along a diametral plane. In this sphere the headlight $c$ is mounted and it is connected with the sphere in any appropriate manner. In the form of construction shown by way of example an electric headlight is represented, the conducting wires $d$ of which are conducted into the sphere through a handle $e$ fixed upon the sphere at a point which is opposite the point where the headlight is arranged and conveniently hollowed for the passage of the conducting wires.

In order to mount the sphere $a$, $b$ on the curved body $f$, a round aperture is cut in this body having a diameter slightly shorter than that of the sphere. The edges of this aperture can be reinforced for example by means of two rings $g$ and $h$ arranged on either side of the edges of the aperture and connected with one another by a certain number of threaded studs $i$ screwed into the outer ring $g$. The sphere $a$, $b$ is inserted from the lower side of the body into the aperture thus cut out and it is covered with a ring $k$ the diameter of which is slightly shorter than the diameter of the sphere and which has holes corresponding with the studs $i$. Between the ring $k$ and the head $m$ of the studs weak springs $n$ are arranged designed to press the ring $k$ upon the sphere $a$—$b$ and consequently to fix this sphere on the car body $f$.

It is easy to understand that the headlight thus mounted on the car body can be moved in any direction by acting upon the handle $e$ and by making the sphere $a$—$b$ turn around its axis.

Fig. 1 shows the left hand side headlight of the car in the normal position, that is to say its axis being directed according to the road indicated by the arrow, this position is at the same time the end position of the headlight towards the inner side of the car, but it can be directed towards the outside until its axis registers with the arrow shown in dotted lines so that the foot path of the road can be lighted, and as at the same time the headlight can be lifted or lowered it is possible to light either the road or a sign post placed at the side of the road.

In order to bring the headlight back to the normal position, the light rays are directed in the direction of the road—there could besides be provided a marking device which at the same time serves for fixing the sphere $a$—$b$ in this position.

Figure 2:
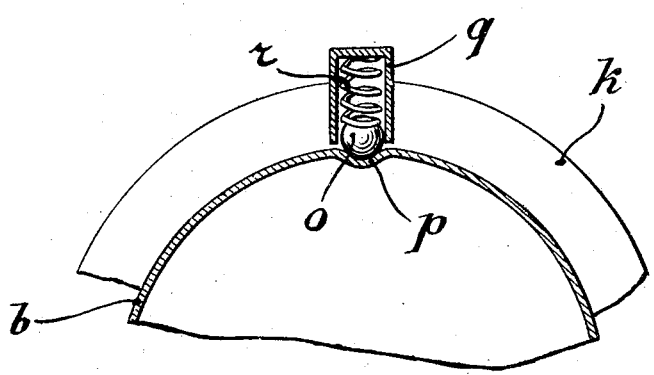
Fig. 2 is a section on lines A—B of Fig. 1.

Fig. 2 shows by way of example a fixing device adapted for this purpose. It consists of a small cavity $p$ made in the hemisphere $b$ and designed to receive a ball $o$ located in a tube $q$ which is arranged radially and carried by the ring $k$. In this tube a spring $r$ is arranged which pushes the ball $o$ into the cavity $p$. The sphere $a$—$b$ is brought to approximately the normal position and is further moved till the ball $o$ gets into the cavity $p$. It is evident that any other device could be used for the same purpose.

Figs. 3 and 4 show in vertical section and in elevation a device designed to be placed preferably at the middle of the bonnet in the direction of the axis of the car.

According to this form of construction the sphere $a$, instead of being clamped in between two rings arranged on either side of its diametral plane, is secured only by one ring $g$ fixed on the car body $f$ and it is maintained against this ring through the action of one spring $s$ surrounding the handle $e$ and bearing, on the one hand against the milled head $t$ of this handle and, on the other hand, against the car body. With this object in view it is necessary to obturate the aperture made in the car body $f$ as a passage for the handle $e$. To obtain this, a collar $u$ is arranged between the two rings $g$ and $h$ which is maintained in position by the screws $x$ which fix the rings $g$ and $h$ on the bonnet $f$. This collar has a central opening which limits the oscillations of the handle $e$. Between the spring $s$ and the collar $u$ a washer $y$ is arranged which is slightly larger than the opening at the centre of the collar $u$ and which moves with the handle $e$. The spring $s$ bears against this washer which itself bears against the collar $u$. The electric wires $d$ which supply the current for the headlights pass through the handle $e$ as it has been hereinbefore described, said handle having been conveniently hollowed for this effect.

As can be seen, the difference between the two forms of construction consists in the following: In the first form of construction the greatest part of the sphere is located under the bonnet, whilst in the second form of construction the sphere is situated completely outside the bonnet. In the first case the springs push the sphere outward, in the second case the spring pulls the sphere inward.

The mounting by ball or knuckle-joint according to this invention permits of fixing the headlights upon the car body like the eye is fixed in the orbit; this fixation is perfect and it permits nevertheless to move the headlights in all directions of a sufficient amount.

Having thus described my invention what I claim is:—

1. A headlight mounting for motor cars or the like, comprising a partially spherical casing for the headlight, a ring of less diameter than said spherical casing carried in fixed position by the car, means frictionally supporting said casing against said ring and means extending inward from the inner portion of said casing by which the latter may be angularly displaced by hand in any direction from the interior of the car.

2. A head-light mounting for motor cars or the like, comprising a partially spherical casing for the headlight, a ring of less diameter than said spherical casing carried in fixed position by the car, a second ring of less diameter than the casing, spring means for clamping the spherical portion of the casing between said rings, and means extending inwardly from the inner portion of said casing by which the latter may be angularly displaced by hand in any direction from the interior of the car.

3. A head-light mounting for motor cars or the like, comprising a spherical headlight casing, a pair of rings one fixed and one movable between which the casing is engaged, springs for pressing the movable ring against the casing, and a lever extending from the rear of the casing to afford means for manual angular displacement of the light from the interior of the car.

4. A head-light mounting for motor cars or the like comprising a spherical head-light casing, a ring support through which the front of said casing projects, frictional engaging means for holding said casing against said front ring support, and means on the rear of the casing by which said casing may be displaced in any angular direction.

5. A head-light mounting for motor cars or the like, comprising a spherical headlight casing, peripheral supporting means therefor of less diameter than the axial diameter of the spherical casing and frictionally engaging the latter on opposite sides of its said diameter, in combination with means on the rear of the casing by which the latter may be displaced in any angular direction.

In witness whereof I have hereunto set my hand in the presence of two witnesses.

ANDRÉ VALLOT.

Witnesses:
 HANSON C. COXE,
 ALFRED RAY.